United States Patent
Sato et al.

(10) Patent No.: US 9,637,113 B2
(45) Date of Patent: May 2, 2017

(54) VEHICLE

(71) Applicant: Toyota Jidosha Kabushiki Kaisha, Toyota-shi, Aichen-ken (JP)

(72) Inventors: Shun Sato, Toyota (JP); Takahiko Tsutsumi, Nisshin (JP); Toshio Sugimura, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/092,368

(22) Filed: Apr. 6, 2016

(65) Prior Publication Data

US 2016/0297425 A1 Oct. 13, 2016

(30) Foreign Application Priority Data

Apr. 10, 2015 (JP) .................. 2015-080723

(51) Int. Cl.
*B60W 20/00* (2016.01)
*B60W 20/20* (2016.01)
(Continued)

(52) U.S. Cl.
CPC ............ *B60W 20/20* (2013.01); *B60W 10/06* (2013.01); *B60W 10/08* (2013.01); *B60W 20/13* (2016.01); *B60W 20/40* (2013.01); *B60K 6/387* (2013.01); *B60K 2006/4825* (2013.01); *B60W 2510/244* (2013.01); *B60W 2710/0666* (2013.01); *B60W 2710/083* (2013.01); *B60Y 2200/92* (2013.01); *B60Y 2300/182* (2013.01); *B60Y 2300/43* (2013.01); *B60Y 2300/60* (2013.01); *B60Y 2400/42* (2013.01); *B60Y 2400/60* (2013.01); *Y10S 903/906* (2013.01); *Y10S 903/914* (2013.01); *Y10S 903/93* (2013.01)

(58) Field of Classification Search
None
See application file for complete search history.

(56) References Cited

U.S. PATENT DOCUMENTS 6,308,129 B1 * 10/2001 Uchida ................... F02D 17/04
477/203
8,326,520 B2 * 12/2012 Bollig ................... B60W 10/06
123/179.4
(Continued)

FOREIGN PATENT DOCUMENTS

| JP | H11-299006 A | 10/1999 |
| JP | 2001-227373 A | 8/2001 |
| JP | 2013-091466 A | 5/2013 |

*Primary Examiner* — Jonathan M Dager
(74) *Attorney, Agent, or Firm* — Dinsmore & Shohl LLP

(57) ABSTRACT

In a vehicle including an engine and a motor generator that are connected to a drive wheel, when a predetermined condition is satisfied during a motor creep mode in which creep torque is generated by the motor generator, an ECU performs motor creep cutoff for decreasing torque of the motor generator. When an engine start request has been issued during the motor creep cutoff, the ECU increases the torque of the motor generator to a target creep torque at a predetermined rate of increase. After the MG torque has reached the target creep torque, the ECU starts the engine. The predetermined rate of increase is set to a rate lower than a rate of increase in engine torque at the start of the engine.

4 Claims, 5 Drawing Sheets

(51) Int. Cl.
    *B60W 10/06*     (2006.01)
    *B60W 10/08*     (2006.01)
    *B60W 20/40*     (2016.01)
    *B60W 20/13*     (2016.01)
    B60K 6/387     (2007.10)
    B60K 6/48     (2007.10)

(56) References Cited

U.S. PATENT DOCUMENTS

| | | | | |
|---|---|---|---|---|
| 8,919,314 | B2* | 12/2014 | Saito | F02N 11/0822 |
| | | | | 123/179.4 |
| 9,308,899 | B2* | 4/2016 | Uchimura | B60T 7/107 |
| 9,399,978 | B2* | 7/2016 | Morisaki | B60K 6/445 |
| 2001/0013701 | A1* | 8/2001 | Onoyama | B60K 6/485 |
| | | | | 290/40 C |
| 2003/0010559 | A1* | 1/2003 | Suzuki | B60K 23/08 |
| | | | | 180/233 |
| 2003/0034188 | A1* | 2/2003 | Gotou | B60K 6/52 |
| | | | | 180/65.225 |
| 2003/0137192 | A1* | 7/2003 | Hano | B60T 7/122 |
| | | | | 303/192 |
| 2003/0151381 | A1* | 8/2003 | Kadota | B60W 10/06 |
| | | | | 318/465 |
| 2003/0225501 | A1* | 12/2003 | De La Salle | B60K 6/485 |
| | | | | 701/93 |
| 2004/0040759 | A1* | 3/2004 | Shimizu | B60K 6/44 |
| | | | | 180/65.225 |
| 2012/0295757 | A1* | 11/2012 | Watanabe | B60W 10/06 |
| | | | | 477/4 |
| 2014/0195082 | A1* | 7/2014 | Takamura | B60L 11/14 |
| | | | | 701/22 |
| 2014/0303823 | A1* | 10/2014 | Nakanishi | B60K 6/48 |
| | | | | 701/22 |

* cited by examiner

VEHICLE

CROSS-REFERENCE TO RELATED APPLICATIONS

The present disclosure claims priority to Japanese Patent Application No. 2015-080723 filed on Apr. 10, 2015, which is incorporated herein by reference in its entirety including the specification, drawings and abstract.

BACKGROUND

1. Technical Field

The present disclosure relates to a vehicle including an engine and a motor generator that are arranged such that power is transmittable to a drive wheel.

2. Description of Related Art

Japanese Patent Application Publication No. 2013-91466 (JP 2013-91466 A) describes a vehicle including an engine, an automatic transmission with a lockup clutch, a motor generator (MG) and a controller. The MG is connected to a rotary shaft that couples the engine to the automatic transmission. The vehicle has a motor creep mode in which torque for propelling the vehicle at a minute speed (hereinafter, also referred to as creep torque) is generated by the MG even in a state where a user is not performing accelerator operation. When the vehicle is stopped during the motor creep mode, the controller performs motor creep cutoff for setting MG torque to zero in order to prevent or reduce the depletion of a battery. In addition, when an engine start request has been issued during the motor creep cutoff, the controller releases the lockup clutch, and cranks the engine by using the MG torque to start the engine.

SUMMARY

As described above, in the vehicle described in JP 2013-91466 A, when an engine start request has been issued during the motor creep cutoff, the engine is started. At this time, there occurs a sudden change from a state where creep torque is cut off to a state where engine output power is transmitted to drive wheels and creep torque is output as a result of the start of the engine, so there is a concern about occurrence of a shock.

The embodiment starts an engine without occurrence of a shock when an engine start request has been issued during the motor creep cutoff.

A vehicle according to this embodiment includes an engine, a motor generator, and a controller. The engine is arranged such that power is transmittable to a drive wheel. The motor generator is arranged such that power is transmittable to the drive wheel. When a predetermined condition is satisfied during a motor creep mode in which creep torque is generated by motor generator, the controller performs motor creep cutoff for decreasing torque of the motor generator. When an engine start request has been issued during the motor creep cutoff, the controller increases the torque of the motor generator toward a target creep torque at a predetermined rate of increase. After the torque of the motor generator has reached the target creep torque, the controller starts the engine. After the engine is started, the controller controls the engine and the motor generator such that a total of torque of the engine and the torque of the motor generator becomes the target creep torque. The predetermined rate of increase is set to a rate lower than a rate of increase in the torque of the engine at the start of the engine. This embodiment may be defined as follows. A vehicle includes: an engine arranged so as to transmit power to a drive wheel; a motor generator arranged so as to transmit power to the drive wheel; and an electronic control unit configured to a) when a predetermined condition is satisfied during a motor creep mode, perform motor creep cutoff for decreasing torque of the motor generator, the motor creep mode being a mode in which creep torque is generated by the motor generator, b) when an engine start request has been issued during the motor creep cutoff, i) increase the torque of the motor generator toward a target creep torque at a first rate of increase, ii) after the torque of the motor generator has reached the target creep torque, start the engine such that a rate of increase in torque of the engine is a second rate of increase, the first rate of increase being a rate lower than the second rate of increase, and iii) control the engine and the motor generator such that, after the engine is started, a total of the torque of the engine and the torque of the motor generator becomes the target creep torque.

With this configuration, when an engine start request has been issued during the motor creep cutoff, the engine is started after the torque of the motor generator has been increased to the target creep torque at the predetermined rate of increase, and, after the engine is started, the engine and the motor generator are controlled such that the total of the torque of the engine and the torque of the motor generator becomes the target creep torque. The predetermined rate of increase is set to the rate lower than the rate of increase in engine torque at the start of the engine. Therefore, in comparison with the case where the engine is suddenly started without increasing the torque of the motor generator at the predetermined rate of increase, a steep increase in output torque is prevented. As a result, when an engine start request has been issued during the motor creep cutoff, it is possible to start the engine without occurrence of a shock.

The vehicle may further include a battery configured to be able to exchange electric power with the motor generator. The motor generator may be able to generate electric power by using power of the engine. The controller may be configured to, when a state of charge of the battery becomes lower than a predetermined value, determine that the engine start request has been issued.

With this configuration, when the state of charge of the battery becomes lower than the predetermined value during the motor creep cutoff, it is possible to cause the motor generator to generate electric power for charging the battery by starting the engine without occurrence of a shock.

The vehicle may further include an automatic transmission provided between the engine and the drive wheel, a rotary shaft provided between the engine and the automatic transmission, a first clutch provided between the rotary shaft and the engine, and a second clutch provided between the rotary shaft and the motor generator. The motor generator may be able to generate electric power by using power that is transmitted from the engine via the first clutch, the rotary shaft and the second clutch.

With this configuration, when the state of charge of the battery becomes lower than the predetermined value during the motor creep cutoff, the engine is started, and each of the first clutch and the second clutch is set to an engaged state. Thus, it is possible to cause the motor generator to generate electric power by using the power of the engine.

The controller may be configured to, after the engine is started during the motor creep cutoff, decrease the torque of the motor generator to zero.

With this configuration, after the engine is started, it is possible to prevent or reduce useless consumption of electric power by decreasing the torque of the motor generator to zero.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
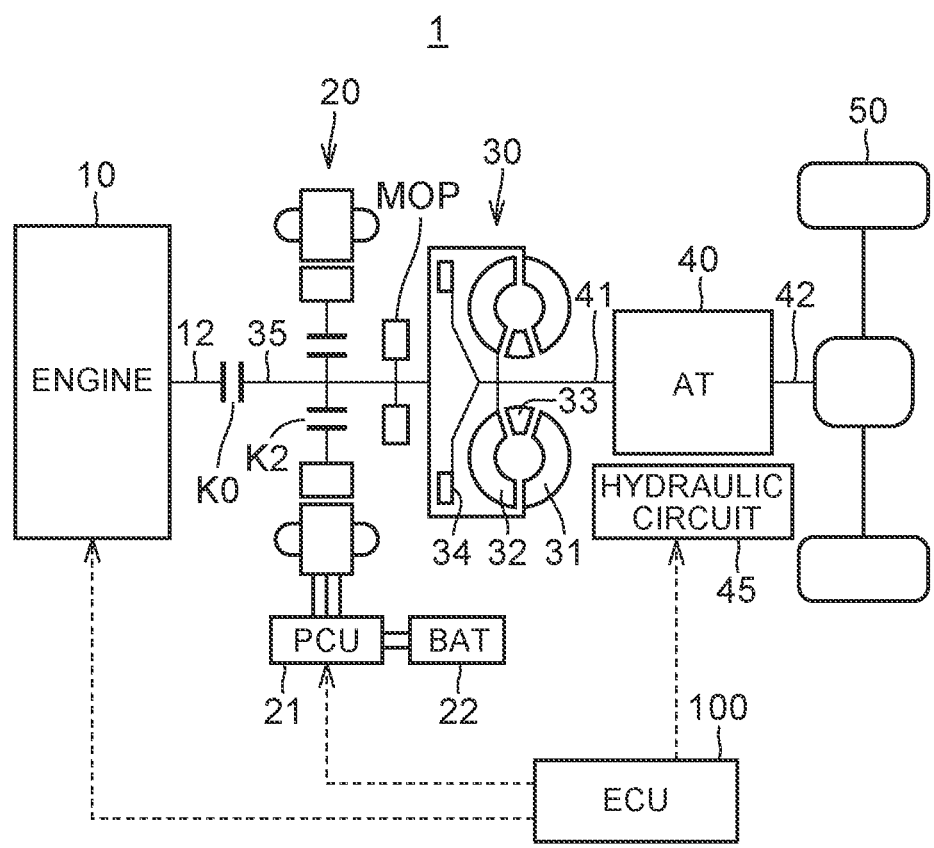
FIG. 1 is the overall configuration diagram of a vehicle.

Hereinafter, an embodiment of the present disclosure will be described in detail with reference to the accompanying drawings. Like reference numerals denote the same or corresponding portions in the drawings, and the description thereof will not be repeated.

Overall Configuration of Vehicle

FIG. 1 is the overall configuration diagram of a vehicle 1 according the present embodiment. The vehicle 1 includes an engine 10, a motor generator (hereinafter, also referred to as "MG") 20, an electric power control circuit (hereinafter also referred to as power control unit (PCU)) 21, a battery 22, a torque converter 30, an automatic transmission 40, a hydraulic circuit 45, drive wheels 50, an engine disconnect clutch K0 (hereinafter, also simply referred to as clutch K0), an MG disconnect clutch K2 (hereinafter, also simply referred to as clutch K2), and an electronic control unit (ECU) 100.

The vehicle 1 is a hybrid vehicle that travels by using the power of at least one of the engine 10 and the MG 20.

A crankshaft 12 of the engine 10 is connected to a rotary shaft 35 via the clutch K0. The rotor of the MG 20 is connected to the rotary shaft 35 via the clutch K2. The rotary shaft 35 is connected to an input shaft 41 of the automatic transmission 40 via the torque converter 30. An output shaft 42 of the automatic transmission 40 is connected to the drive wheels 50.

The engine 10 is an internal combustion engine, such as a gasoline engine and a diesel engine. The MG 20 is driven by high-voltage electric power that is supplied from the battery 22 via the PCU 21. The MG 20 generates electric power when the MG 20 is rotated by power that is transmitted from the rotary shaft 35 (power that is transmitted from the engine 10 or the drive wheels 50).

Hereinafter, an operation that each of the clutch K0 and the clutch K2 is set to an engaged state and the MG 20 generates electric power by using power that is transmitted from the engine 10 to the MG 20 via the clutch K0, the rotary shaft 35 and the clutch K2 is also referred to as engine power generation.

The battery 22 stores electric power to be supplied to the MG 20. The PCU 21 converts electric power between the MG 20 and the battery 22

The torque converter 30 includes a pump impeller 31, a turbine runner 32, a stator 33 and a lockup clutch 34. The lockup clutch 34 is controlled to any one of an engaged state (lockup-on control state), a released state (lockup-off control state) and a half-engaged state (flex control state) on the basis of a control signal from the ECU 100.

When the lockup clutch 34 is in the engaged state, the pump impeller 31 and the turbine runner 32 rotate integrally with each other. When the lockup clutch 34 is in the released state, power is transmitted by hydraulic oil between the pump impeller 31 and the turbine runner 32, so there can be a rotation speed difference between the pump impeller 31 and the turbine runner 32 (a slip of the torque converter 30).

When the lockup clutch 34 is in the half-engaged state, power is transmitted by hydraulic oil and the lockup clutch 34 between the pump impeller 31 and the turbine runner 32. Therefore, there can be a rotation speed difference between the pump impeller 31 and the turbine runner 32; however, the difference is smaller than that in the case where the lockup clutch 34 is in the engaged state.

The automatic transmission 40 is a stepped automatic transmission that is able to selectively establish a plurality of gear positions having different speed ratios (the ratios of the rotation speed of the input shaft 41 to the rotation speed of the output shaft 42).

A mechanical oil pump MOP is connected to the rotary shaft 35. When the mechanical oil pump MOP is operated by the power of the rotary shaft 35, the mechanical oil pump MOP draws hydraulic oil stored in an oil pan (not shown) and then discharges the hydraulic oil to the hydraulic circuit 45. The hydraulic circuit 45 regulates hydraulic pressure, which is supplied from the mechanical oil pump MOP or an electric oil pump (not shown) as a source pressure, to a control hydraulic pressure (K0 pressure) of the clutch K0, a control hydraulic pressure (K2 pressure) of the clutch K2 or a control hydraulic pressure (LU pressure) of the lockup clutch 34 in response to a control signal from the ECU 100.

The vehicle 1 includes a plurality of sensors (not shown) for detecting physical quantities that are required to control the vehicle 1. The physical quantities include an accelerator operation amount, a vehicle speed, a rotation speed Ne of the engine 10, a rotation speed Nm of the MG 20, a rotation speed of the rotary shaft 35, a rotation speed Nt of the turbine runner 32, a shift position, and the like. These sensors transmit detected results to the ECU 100.

The ECU 100 includes a central processing unit (CPU) (not shown) and a memory (not shown). The ECU 100 executes predetermined computations on the basis of information from the sensors and information stored in the memory, and controls devices of the vehicle 1 on the basis of the computed results.

The ECU 100 causes the vehicle 1 to travel in any one of a motor mode, a hybrid mode and an engine mode. In the motor mode, the ECU 100 causes the rotary shaft 35 to be rotated by the power of the MG 20 by engaging the clutch K2 and releasing the clutch K0. In the hybrid mode, the ECU 100 causes the rotary shaft 35 to be rotated by the power of at least one of the engine 10 and the MG 20 by engaging the clutch K2 and engaging the clutch K0. In the engine mode, the ECU 100 causes the rotary shaft 35 to be rotated by the power of the engine 10 by releasing the clutch K2 and engaging the clutch K0.

When the shift position is a drive position (forward drive position or reverse drive position), the ECU 100 generates torque for propelling the vehicle 1 at a minute speed (hereinafter, referred to as creep torque) even in a state where a user is not performing accelerator operation.

Hereinafter, creep torque that is generated by the MG 20 is termed as motor creep torque. During the motor mode or the hybrid mode (that is, in a state where the MG 20 is connected to the rotary shaft 35 by setting at least the clutch K2 to the engaged state), a mode in which motor creep torque is generated while the engine 10 is stopped is termed as motor creep mode.

When a creep cutoff condition is satisfied during the motor creep mode, the ECU 100 performs motor creep cutoff for decreasing the torque of the MG 20 (hereinafter, referred to as MG torque) to zero. The motor creep cutoff just needs to decrease the MG torque, and is not necessarily limited to decreasing the MG torque to zero.

In the present embodiment, the creep cutoff condition is set to a condition that the vehicle speed is zero in a state where the user is depressing a brake pedal. That is, when the vehicle 1 is stopped in a state where brake torque is acting as a result of user's brake operation, useless consumption of electric power of the battery 22 is prevented or reduced by setting the MG torque to zero. The creep cutoff condition is not necessarily limited to the above-described condition. For example, the condition that the vehicle speed is completely zero may be relieved to a condition that the vehicle speed is lower than a minute speed (for example, several kilometers per hour). During the motor creep cutoff, the clutch K2 is kept in the engaged state in preparation for the next start of movement of the vehicle 1.

Control when Engine Start Request has been Issued during Motor Creep Cutoff

As described above, when the creep cutoff condition is satisfied during the motor creep mode, the motor creep cutoff is performed, so the MG torque becomes zero. Therefore, during the motor creep cutoff, basically, the state of charge (hereinafter, referred to as SOC) of the battery 22 is not consumed by the MG 20.

However, even during the motor creep cutoff, the electric power of the battery 22 can be consumed as a result of operation of auxiliaries, such as an air conditioner (not shown). When the SOC becomes lower than a lower limit value Smin as a result of the consumption of the electric power of the battery 22, it is required to perform engine power generation by starting the engine 10 and setting the clutch K0 to the engaged state in order to charge the battery 22.

However, if the engine 10 is suddenly started during the motor creep cutoff, there is a concern about occurrence of a shock.

Figure 2:
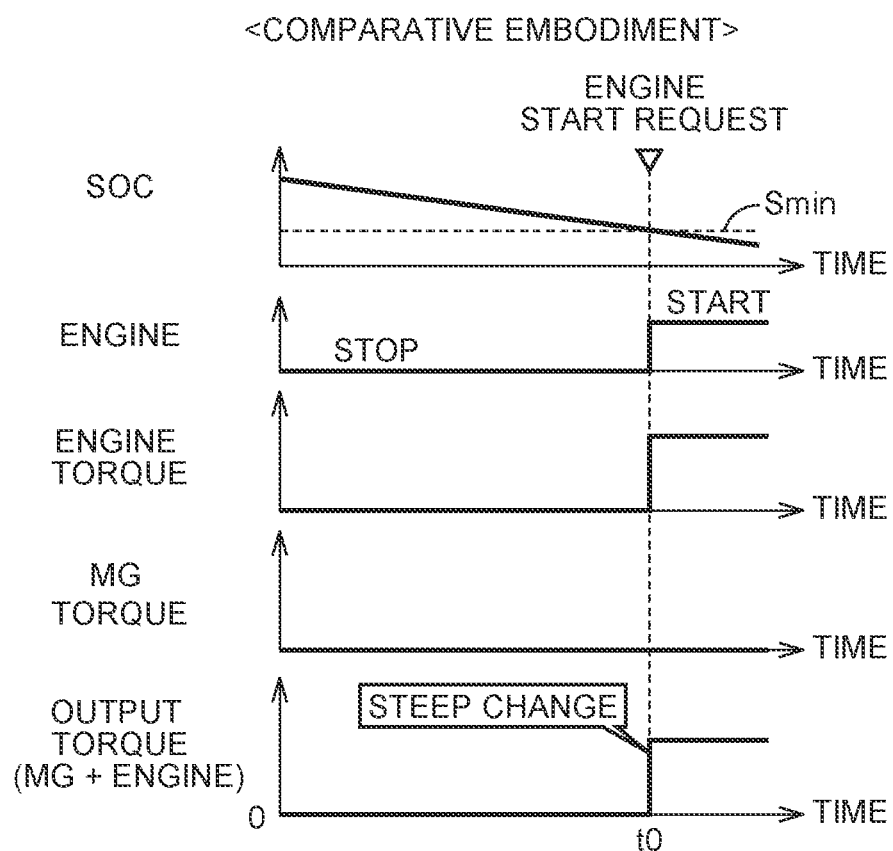
FIG. 2 is a timing chart that shows a comparative embodiment to an embodiment.

FIG. 2 is a timing chart that schematically shows a change in output torque of the vehicle 1 in the case where the engine 10 is suddenly started during the motor creep cutoff as a comparative embodiment to the present embodiment.

Before time t0, the motor creep cutoff is being performed, so the engine 10 is stopped, and the MG torque is zero. However, the SOC is gradually decreasing as a result of operation of the auxiliaries.

At time t0, the SOC decreases to the lower limit value Smin, and an engine start request is issued. However, if the engine 10 is suddenly started in response to the engine start request, there occurs a sudden change from a state where creep torque is cut off to a state where creep torque having a magnitude corresponding to engine torque is output. At the start of the engine, the engine torque steeply increases as a result of combustion of fuel, so torque that is output to the drive wheels 50 (hereinafter, referred to as output torque) also steeply increases. Therefore, there is a concern about occurrence of a shock.

In light of such an inconvenience, when an engine start request has been issued during the motor creep cutoff, the ECU 100 according to the present embodiment performs MG torque increase for increasing the MG torque from zero to a target creep torque at a predetermined rate of increase. After the MG torque has reached the target creep torque, the ECU 100 starts the engine 10, and returns the MG torque to zero again.

The predetermined rate of increase that is used at the time of the MG torque increase is set to a rate lower than the rate of increase in engine torque at the start of the engine. Therefore, in comparison with the case where the engine 10 is suddenly started without performing the MG torque increase, a steep increase in output torque is prevented. As a result, when an engine start request has been issued during the motor creep cutoff, it is possible to start the engine 10 without occurrence of a shock.

The target creep torque that is used at the time of the MG torque increase is set to a value corresponding to an engine torque after the start of the engine. Therefore, by returning the MG torque to zero again in response to an increase in engine torque after the start of the engine, fluctuations in output torque at the start of the engine are prevented or reduced. In addition, useless consumption of electric power by the MG is also prevented or reduced.

In the present embodiment, the case where an engine start request has been issued not only includes the case where an engine start request has been actually issued but also the case where an engine start request is predicted to be issued. By starting the MG torque increase in the case where an engine start request is predicted to be issued, it is possible to reduce a time lag from when an engine start request has been issued thereafter to when the engine 10 is started as much as possible.

Hereinafter, the case where the MG torque increase is started in the case where an engine start request is predicted to be issued during the motor creep cutoff will be described.

Figure 3:
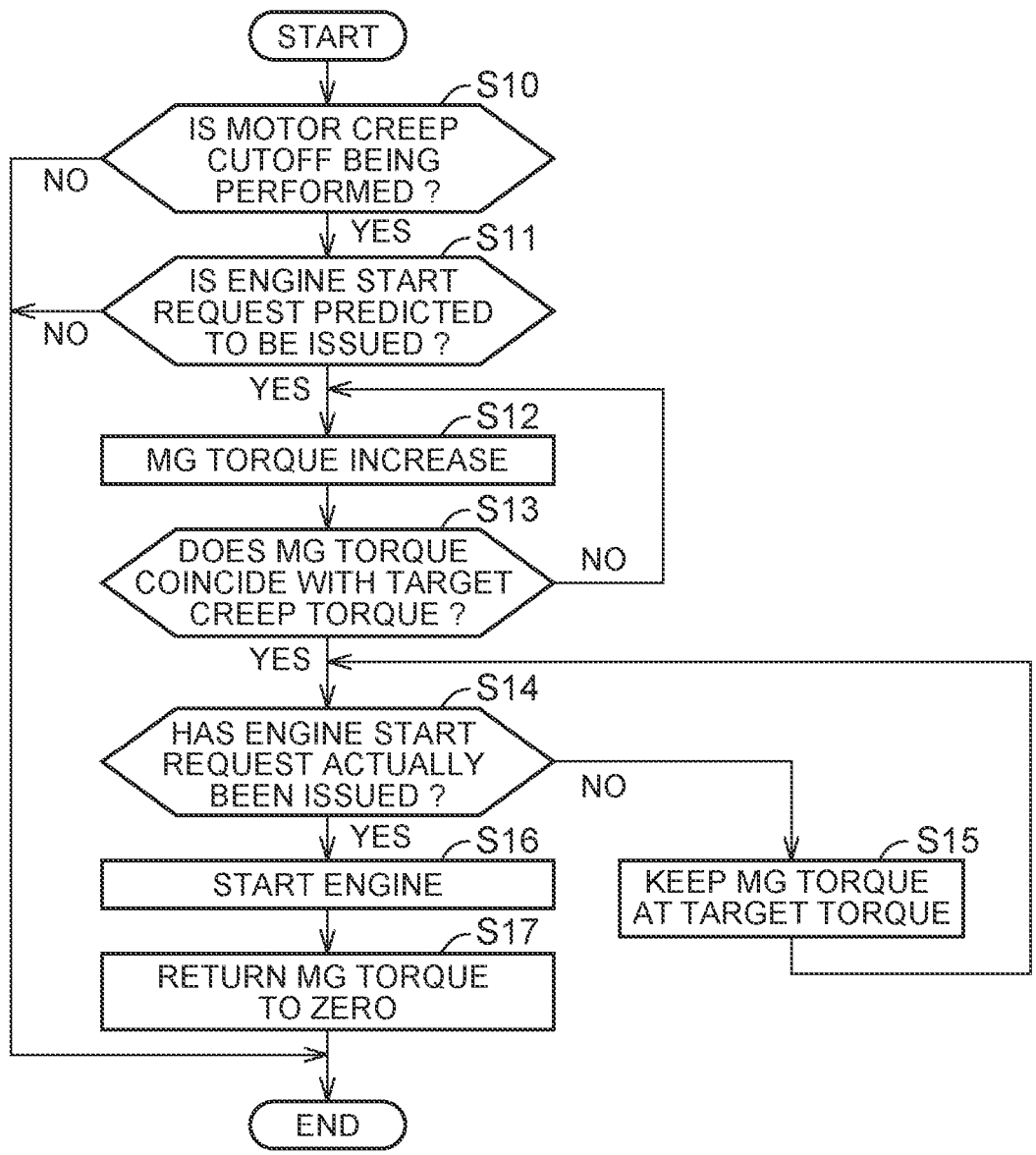
FIG. 3 is a flowchart (part 1) that shows the procedure of an ECU.

FIG. 3 is a flowchart that shows the procedure that is executed by the ECU 100 according to the present embodiment. This flowchart is repeatedly executed at predetermined intervals.

In step (hereinafter, step is abbreviated as "S") 10, the ECU 100 determines whether the motor creep cutoff is being performed. When the creep cutoff condition (in the present embodiment, the condition that the vehicle speed is zero in a state where the user is depressing the brake pedal as described above) is satisfied during the motor creep mode, the ECU 100 determines that the motor creep cutoff is being performed. When the motor creep cutoff is not being performed (NO in S10), the ECU 100 ends the process.

When the motor creep cutoff is being performed (YES in S10), the ECU 100 determines in S11 whether an engine start request is predicted to be issued. The ECU 100, for example, compares the SOC with a threshold S1 higher by a predetermined value than the lower limit value Smin at which the battery 22 needs to be charged. When the SOC is lower than the threshold S1, the ECU 100 predicts that the SOC will decrease to the lower limit value Smin soon, that is, an engine start request will be issued. When an engine start request is not predicted to be issued (NO in S11), the ECU 100 ends the process.

When an engine start request is predicted to be issued (YES in S11), the ECU 100 performs the above-described MG torque increase in S12. That is, the ECU 100 gradually increases the MG torque toward the target creep torque at the predetermined rate of increase in preparation for a future engine start request.

In S13, the ECU 100 determines whether the MG torque has reached the target creep torque. When the MG torque has not reached the target creep torque (NO in S13), the ECU 100 returns the process to S12, and continues the MG torque increase.

When the MG torque has reached the target creep torque (YES in S13), the ECU 100 determines in S14 whether an engine start request has been actually issued. For example, when the SOC becomes lower than the lower limit value Smin, the ECU 100 determines that an engine start request has been actually issued.

When an engine start request has not been actually issued (NO in S14), the ECU 100 keeps the MG torque at the target creep torque in S15. After that, the ECU 100 returns the process to S14, and waits until an engine start request is actually issued. When an engine start request is not actually issued although a state where the MG torque is kept at the target creep torque has continued for a predetermined time, the control routine may be forcibly ended in order to prevent or reduce useless consumption of electric power.

When an engine start request has been actually issued (YES in S14), the ECU 100 starts the engine 10 in S16. At this time, when the clutch K0 is in a released state, the ECU 100 changes the clutch K0 to the engaged state. Thus, each of the clutch K0 and the clutch K2 is set to the engaged state, so the power of the engine 10 is transmittable to the MG 20 via the clutch K0, the rotary shaft 35 and the clutch K2 (engine power generation is enabled).

After that, in S17, the ECU 100 returns the MG torque to zero in response to an increase in engine torque.

Figure 4:
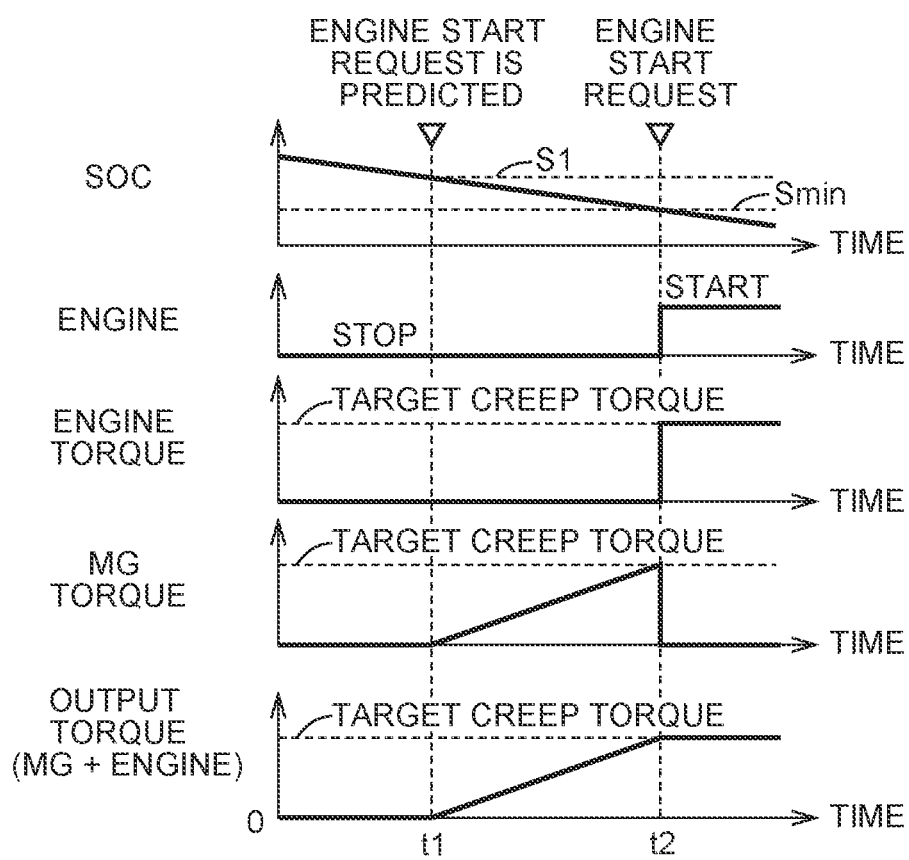
FIG. 4 is a timing chart that schematically shows a change in the output torque of the vehicle.

FIG. 4 is a timing chart that schematically shows a change in the output torque of the vehicle 1 that is controlled by the ECU 100 according to the present embodiment.

Before time t1, the motor creep cutoff is being performed, so the engine 10 is stopped, and the MG torque is zero. However, the SOC is gradually decreasing as a result of operation of the auxiliaries.

As the SOC becomes lower than the threshold S1 at time t1, the ECU 100 predicts that an engine start request will be issued, and starts the MG torque increase. At this time, the ECU 100 gradually increases the MG torque at the predetermined rate of increase in order to avoid a steep increase in output torque. Thus, the rate of increase in output torque is gentler than that in the case where the engine is suddenly started without performing the MG torque increase, so it is possible to avoid a shock. It is also possible to keep the vehicle 1 in the stopped state when a user who realizes an increase in output torque increases the depression amount of the brake pedal.

As the MG torque reaches the target creep torque at time t2, the ECU 100 determines whether an engine start request has been actually issued. In the example shown in FIG. 3, because the SOC has decreased to the lower limit value Smin at time t2, the ECU 100 determines that an engine start request has been actually issued, starts the engine 10, and returns the MG torque to zero in response to an increase in engine torque. Thus, it is possible to achieve the target creep torque by using the engine torque while avoiding a steep increase in output torque due to the start of the engine. It is also possible to eliminate useless consumption of electric power by the MG 20.

Although not shown in FIG. 4, after that, when engine power generation is started and the battery 22 begins to be charged, the SOC is gradually recovered to a value higher than or equal to the lower limit value Smin.

As described above, when an engine start request is predicted to be issued during the motor creep cutoff, the ECU 100 according to the embodiment of the present disclosure performs the MG torque increase for increasing the MG torque from zero to the target creep torque at the predetermined rate of increase. After the MG torque has reached the target creep torque, the ECU 100 starts the engine 10, and decreases the MG torque in response to an increase in engine torque.

The predetermined rate of increase, which is used at the time of the MG torque increase, is set to a rate lower than the rate of increase in engine torque at the start of the engine. Thus, in comparison with the case where the engine 10 is suddenly started without performing the MG torque increase, a steep increase in output torque is prevented. As a result, when an engine start request has been issued during the motor creep cutoff, it is possible to start the engine 10 without occurrence of a shock.

Alternative Embodiments (1) In the above-described embodiment, the MG torque increase is started when an engine start request is predicted to be issued during the motor creep cutoff; instead, the MG torque increase may be started when an engine start request has been actually issued.

Figure 5:
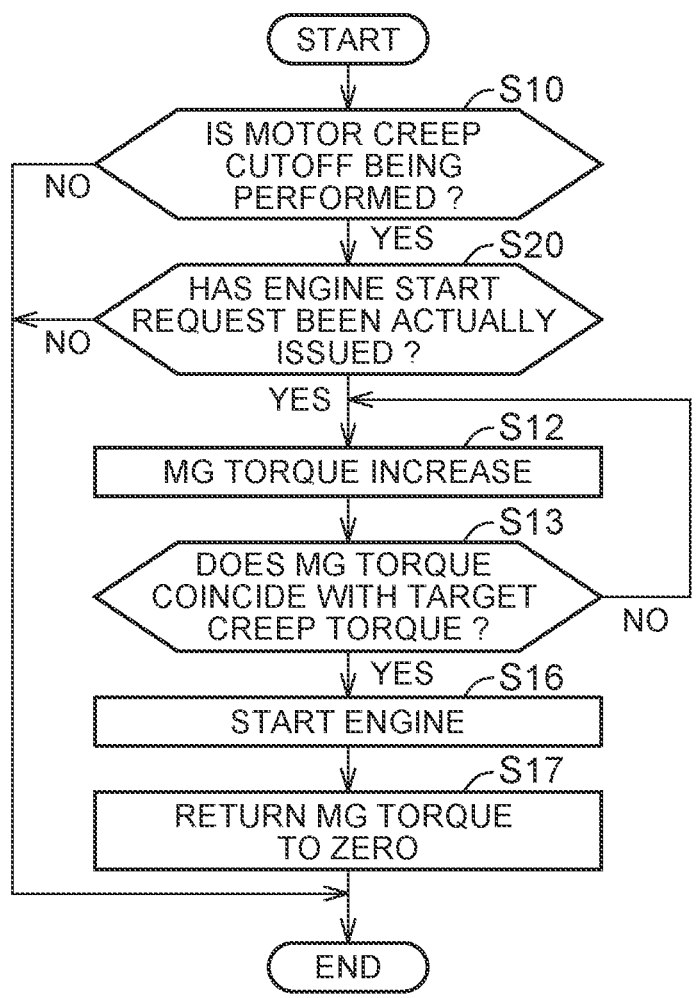
FIG. 5 is a flowchart (part 2) that shows the procedure of the ECU.

FIG. 5 is a flowchart that shows the procedure that is executed by the ECU 100 according to the present alternative embodiment. Steps to which the same step numbers as those of the steps shown in FIG. 3 are assigned among steps shown in FIG. 5 are already described above, so the detailed description thereof will not be repeated.

When the motor creep cutoff is being performed (YES in S10), the ECU 100 determines in S20 whether an engine start request has been actually issued. For example, the ECU 100 determines that an engine start request has been actually issued when the SOC becomes lower than the lower limit value Smin.

When an engine start request has been actually issued (YES in S20), the ECU 100 starts the MG torque increase in S12, and determines in S13 whether the MG torque has reached the target creep torque.

When the MG torque has not reached the target creep torque (NO in S13), the ECU 100 returns the process to S12, and continues the MG torque increase. When the MG torque has reached the target creep torque (YES in S13), the ECU 100 starts the engine 10 in S16, and returns the MG torque to zero in response to an increase in engine torque in S17.

With this configuration, there is a slight time lag from when an engine start request has been actually issued to when the engine 10 is started, so, as in the case of the above-described embodiment, it is possible to start the engine 10 without occurrence of a shock. In addition, the engine 10 is immediately started after the MG torque has reached the target creep torque, so it is possible to smoothly execute control from the MG torque increase to the start of the engine.

(2) In the above-described embodiment, the target creep torque that is used at the time of the MG torque increase is set to a value corresponding to the engine torque after the start of the engine; instead, the target creep torque may be set to a value different from the value corresponding to the engine torque after the start of the engine. For example, the target creep torque may be set on the basis of electric power that is required to charge the battery 22.

When the target creep torque is a value different from the value corresponding to the engine torque after the start of the engine, the engine 10 and the MG 20 just need to be controlled after the start of the engine such that the total of the engine torque and the MG torque becomes the target creep torque. Thus, it is possible to achieve the target creep torque by using the engine torque and the MG torque.

(3) In the above-described embodiment, the case where engine power generation is required because of a decrease in SOC is described as a factor of issuing an engine start request during the motor creep cutoff; however, the of issuing an engine start request is not limited to this case.

For example, when a brake booster that assists a user in order to reduce brake operation force by utilizing the intake negative pressure of the engine is provided, an engine start request can be issued when the operation of the brake booster is required as well.

The embodiment described above is illustrative and not restrictive in all respects. The scope of the present disclosure is defined by the appended claims rather than the above description. The scope of the present disclosure is intended to encompass all modifications within the scope of the appended claims and equivalents thereof.

What is claimed is:

1. A vehicle comprising:
   an engine arranged so as to transmit power to a drive wheel;
   a motor generator arranged so as to transmit power to the drive wheel; and
   an electronic control unit configured to
   a) when a predetermined condition is satisfied during a motor creep mode, perform motor creep cutoff for decreasing torque of the motor generator, the motor creep mode being a mode in which creep torque is generated by the motor generator,
   b) when an engine start request has been issued during the motor creep cutoff,
      i) increase the torque of the motor generator toward a target creep torque at a first rate of increase,
      ii) after the torque of the motor generator has reached the target creep torque, start the engine such that a rate of increase in torque of the engine is a second rate of increase, the first rate of increase being a rate lower than the second rate of increase, and
      iii) control the engine and the motor generator such that, after the engine is started, a total of the torque of the engine and the torque of the motor generator becomes the target creep torque.

2. The vehicle according to claim 1, further comprising:
   a battery configured to be able to exchange electric power with the motor generator, wherein
   the motor generator is able to generate electric power by using power of the engine, and
   the electronic control unit is configured to, when a state of charge of the battery becomes lower than a predetermined value, determine that the engine start request has been issued.

3. The vehicle according to claim 1, further comprising:
   an automatic transmission provided between the engine and the drive wheel;
   a rotary shaft provided between the engine and the automatic transmission;
   a first clutch provided between the rotary shaft and the engine; and
   a second clutch provided between the rotary shaft and the motor generator, wherein
   the motor generator is able to generate electric power by using power that is transmitted from the engine via the first clutch, the rotary shaft and the second clutch.

4. The vehicle according to claim 1, wherein
   the electronic control unit is configured to, after the engine is started during the motor creep cutoff, decrease the torque of the motor generator to zero.

* * * * *